March 2, 1954   H. SCHOEPE ET AL   2,670,633
CHANGE SPEED TRANSMISSION FOR MACHINE TOOLS
Filed Dec. 7, 1951   5 Sheets-Sheet 1

INVENTORS
HARRY SCHOEPE
HENRY W. SPREITZER
BY
Williams, David & Hoffmann
ATTORNEYS March 2, 1954 H. SCHOEPE ET AL 2,670,633
CHANGE SPEED TRANSMISSION FOR MACHINE TOOLS
Filed Dec. 7, 1951 5 Sheets-Sheet 2

INVENTORS
HARRY SCHOEPE
HENRY W. SPREITZER
BY
Williams, David & Hoffmann
ATTORNEYS INVENTORS
HARRY SCHOEPE
HENRY W. SPREITZER
BY Hudson, Boughton,
Williams, David & Hoffmann.
ATTORNEYS

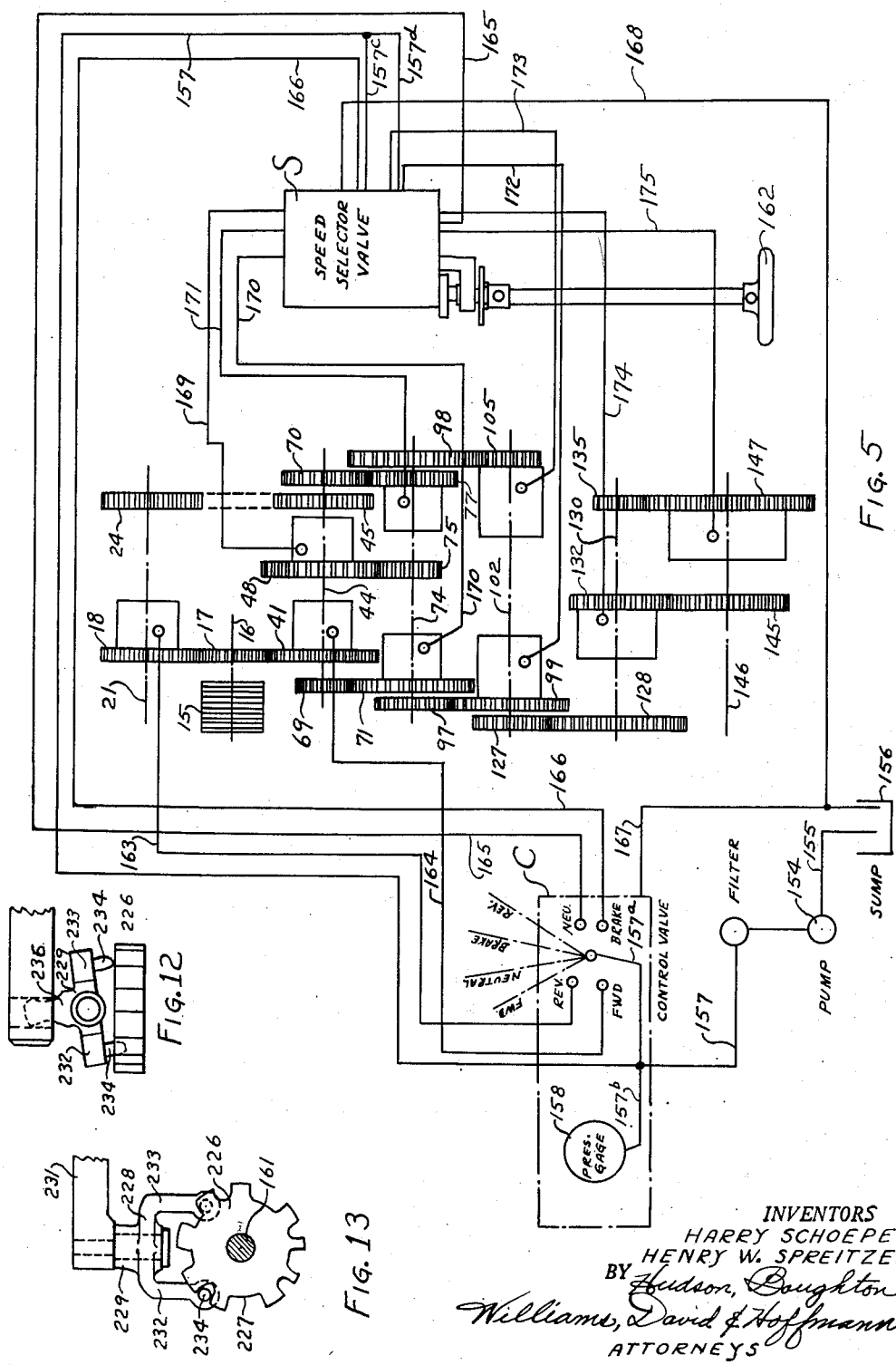

March 2, 1954    H. SCHOEPE ET AL    2,670,633
CHANGE SPEED TRANSMISSION FOR MACHINE TOOLS
Filed Dec. 7, 1951            5 Sheets-Sheet 5
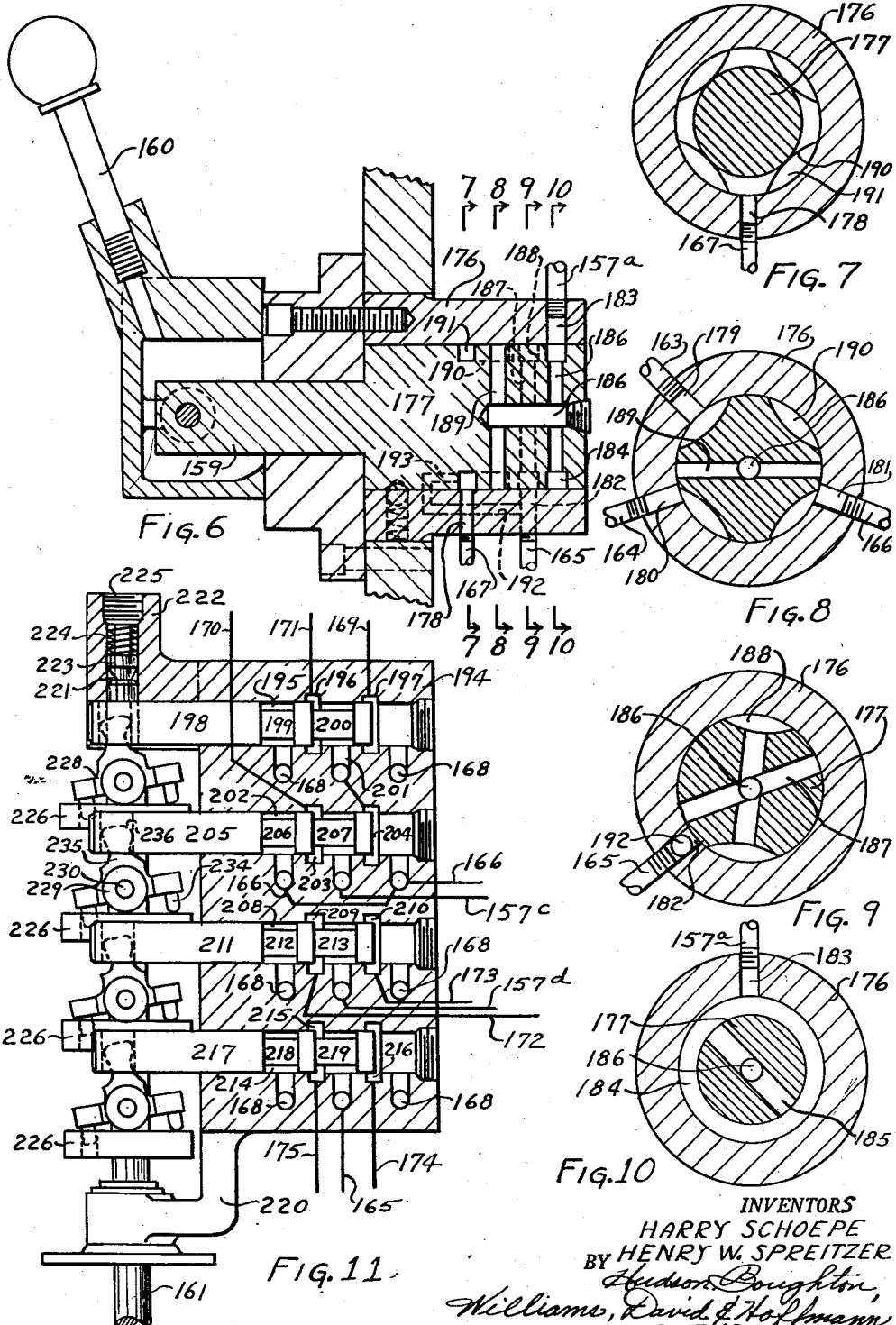
INVENTORS
HARRY SCHOEPE
HENRY W. SPREITZER
BY
Williams, David & Hoffmann
ATTORNEYS Patented Mar. 2, 1954

2,670,633

UNITED STATES PATENT OFFICE 2,670,633

CHANGE SPEED TRANSMISSION FOR MACHINE TOOLS

Harry Schoepe, Seven Hills, and Henry W. Spreitzer, Parma, Ohio, assignors to The Warner & Swasey Company, Cleveland, Ohio, a corporation of Ohio Application December 7, 1951, Serial No. 260,408

18 Claims. (Cl. 74—359)

This invention relates to a change speed transmission particularly adapted to be used in the headstock of a machine tool and the control for said transmission.

In modern machine tools it is desirable that the rotating work or tool spindle be capable of being driven at a relatively large number of different speeds. In order to provide the desired large number of different speeds of the spindle the change speed transmission in the headstock tends to be bulky, to require the use of long shafts and to necessitate unduly large headstocks. This is especially true with respect to smaller size machine tools, such as small size turret lathes and the like.

An object of the present invention is to provide an improved and novel change speed transmission in the headstock of a machine tool which is capable of imparting a relatively large number of different speeds to the spindle but at the same time is compact, utilizes relatively short shafts and enables the overall size of the headstock to be kept at a minimum.

It is desirable in machine tools that the change speed transmission in the headstock be silent in operation and such that the speeds can be changed under load easily and without danger of damaging the parts, and a further object of the present invention is to provide a change speed transmission for the headstock of a machine tool which accomplishes the advantages referred to.

A further object of the invention is to provide a change speed transmission in the headstock of a machine tool which is so constructed that certain of the engageable and disengageable elements of the transmission may be simultaneously engaged to produce a braking action on the spindle and without likelihood of damage to the parts and with the further advantage that special brake mechanism for the purpose of braking the spindle is eliminated and the function of such special brake mechanism is obtained through a predetermined operation of the change speed elements of the transmission.

A further object of the invention is to provide in a transmission for a headstock of a machine tool such as referred to in the preceding objects improved means for effecting the speed changes quietly and while under load and for effecting the braking of the spindle, together with improved controls for said means.

A still further object is to provide in a transmission for a headstock of a machine tool such as referred to in the preceding objects improved control means for the transmission such that during spindle rotation at a certain speed in one operative step of the work cycle a different spindle speed can be preselected for the next operative step and then readily obtained at the end of said one operative step.

An additional object is to provide in a transmission such as referred to in the last named object improved control means such that movement of said means in one direction effects preselection of the spindle speeds and movement thereof in another direction obtains the preselected speed.

Further and additional objects and advantages not hereinbefore referred to will become apparent hereinafter during the detailed description of a preferred embodiment of the invention which is to follow and which embodiment is illustrated in the accompanying drawings, wherein Fig. 1 is a fragmentary front elevational view of a machine tool showing the headstock thereof and wherein is used a change speed transmission embodying the invention.

Fig. 5 is a diagrammatic view of the change speed transmission shown in Figs. 3 and 4 and of the hydraulic control and operating circuits for the transmission and which include the main control valve and the speed selector valve.

Fig. 6 is a longitudinal section of the main control valve in the neutral position.

Figs. 7 to 10 inclusive are transverse sectional views taken, respectively, on lines 7—7, 8—8, 9—9 and 10—10 of Fig. 6.

Fig. 11 is a longitudinal section of the speed selector valve, and

Figs. 12 and 13 are detail views of certain parts of the speed selector valve which are duplicated a number of times in the speed selector valve.

Figure 1:
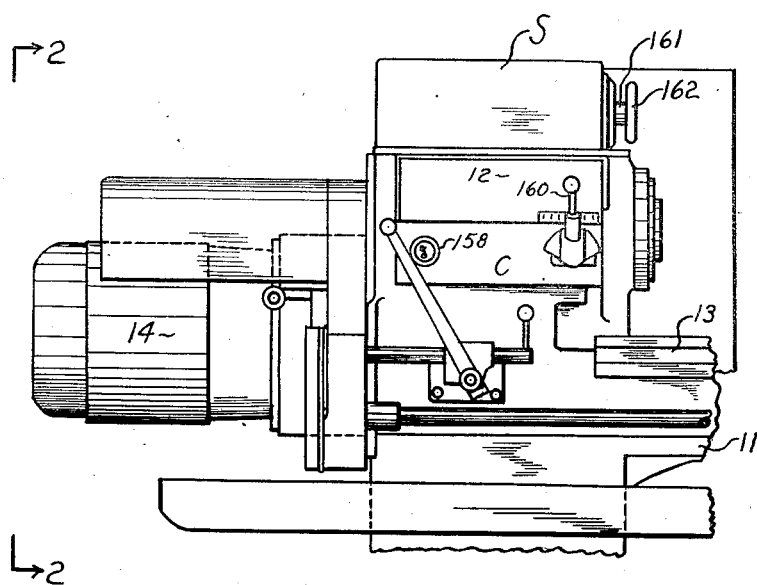
Figure 2:
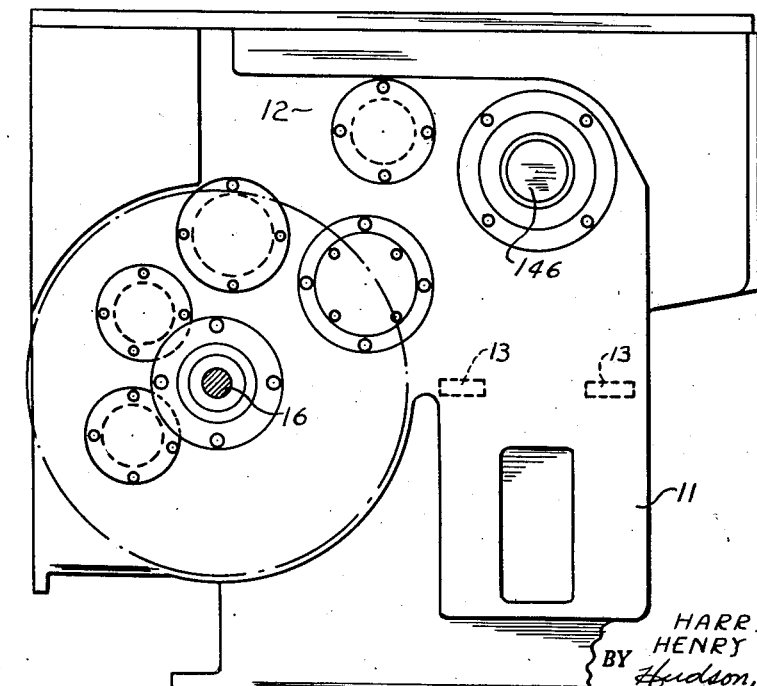
Fig. 2 is an end elevational view of the headstock of the machine tool shown in Fig. 1 and is taken looking from the left hand side of Fig. 1 from a position substantially indicated by line 2—2 of Fig. 1.

Referring to Fig. 1, the bed of the machine tool is indicated at 11 and at one end of the bed is the headstock 12. The bed is provided with parallel front and rear ways 13 which extend from the headstock toward the other end of the bed and upon which ways the slides of the machine tool move toward and from the rotatable work spindle mounted in the headstock 12 on an axis parallel to said ways as is well understood in the art.

Further description of the general features of the machine tool need not be explained in detail since they are well understood in the art.

The source of power for the change speed transmission in the headstock and which transmission and its control means embody the present invention may be any suitable source of power. For purposes of illustration the source of power is indicated as an electric motor 14 supported by the bed adjacent the end thereof which is provided with the headstock and said motor 14 may drive a pulley 15 mounted on a power input shaft 16, said drive to the pulley 15 being by way of a suitable pulley on the shaft of the motor 14 and a belt extending between said suitable pulley and the pulley 15 as will be well understood in the art.

Figure 3:
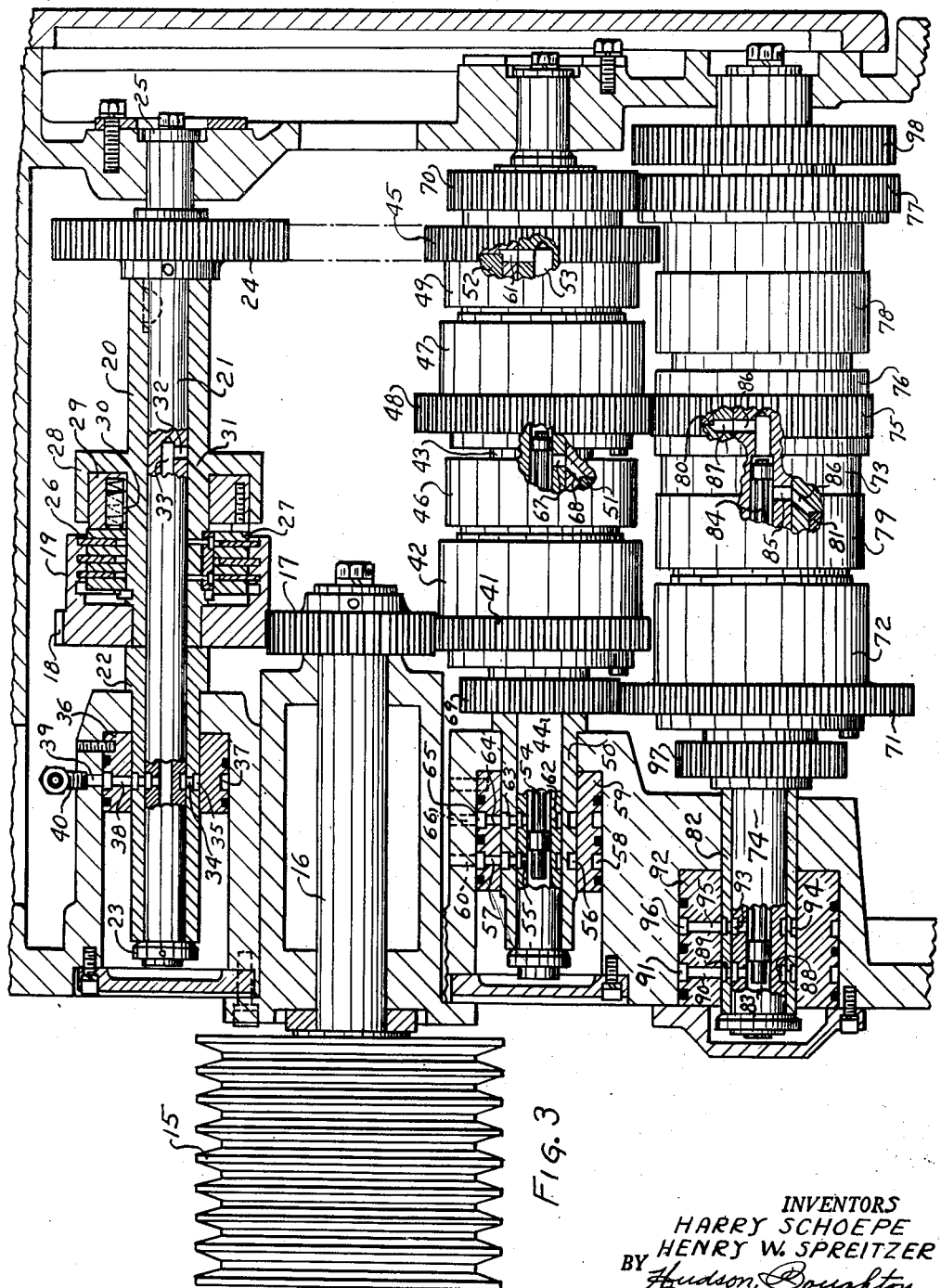
Fig. 3 is a developed partial sectional and partial elevational view of a portion of the change speed transmission in the headstock and embodying the present invention, said portion including that part of the transmission formed by the input shaft, the forward and reverse shafts, one of the change speed gear shafts and the corresponding clutches.

The power input shaft 16 extends into the headstock through the end wall thereof and is rotatably supported in suitable bearings formed in said end wall, as clearly indicated in Fig. 3, and has fixed to it within the headstock and adjacent to said end wall a drive gear 17. The drive gear 17 meshes with a gear 18 that is formed on a clutch sleeve 19 which is freely rotatable on an elongated sleeve 20 which is keyed to a reverse shaft 21 extending parallel to the power input shaft 16 and supported in suitable bearings formed in the headstock. The gear 18 and the clutch sleeve 19 are held against axial movement in one direction relative to the elongated sleeve 20 by a shoulder formed on the latter and in the other direction by the head of a headed sleeve 22 which is fixed in an internal supporting portion of the headstock and within which sleeve 22 the reverse shaft 21 rotates. The reverse shaft 21 is maintained against axial displacement relative to the sleeves 20 and 22 by a collar 23 secured to one end of the shaft 21 and engaging the end of the sleeve 22 and by a reverse gear 24 fixed to the shaft 21 and engaging the adjacent end of the elongated sleeve 20 and also by a collar 25 fixed to the end of the shaft 21 and engaging the bearing in the headstock which supports the last mentioned end of the shaft.

The clutch sleeve 19 which has formed thereon the gear 18 mounts internally spaced clutch plates 26 and said clutch plates 26 alternate with clutch disks 27 which are fixed to the elongated sleeve 20 to rotate therewith. The clutch provided by the plates 26 and disks 27 is of the friction type so that slippage may occur when a predetermined load has been exceeded.

The elongated sleeve 20 has integral therewith or fixed thereon a cup-shaped housing 28, the open end of which is adjacent to the clutch in the sleeve 19 and said housing slidably mounts a piston-like clutch actuator 29 which engages the end clutch disk 27, wherefore if the actuator 29 is moved toward the clutch in the sleeve 19 the disks 27 and clutch plates 26 will be pressed into frictional driving contact with each other to cause the clutch sleeve 19 and gear 18 to impart rotation to the elongated sleeve 20 and the reverse shaft 21 as will be well understood in the art.

The clutch actuator 29 is provided with one or more spring plungers 30 which engage the end clutch disk 27 and function to move the clutch actuator inwardly of its housing 28 to engage the bottom wall of the housing and to effect driving disengagement of the clutch plates 26 and clutch disks 27.

The clutch actuator 29 is moved in the clutch engaging direction by fluid pressure power such as hydraulic pressure. It will be understood that the clutch actuator might be moved by other power means, such as electrical or mechanical, if desired, and this understanding applies to the actuators of other clutches later to be described. The pressure medium is brought into the housing 28 to act on the actuator 29 and effect engagement of the clutch in the clutch sleeve 19, such clutch being hereinafter designated as the "reverse" clutch, by means of a bore 31 in the sleeve 20 which communicates at all times with a radial port 32 formed in the shaft 21, it being recalled that said shaft and the elongated sleeve 20 are keyed together for rotation as a unit.

The port 32 communicates with one end of an elongated axial bore 33 formed in the shaft 21. The opposite end of the bore 33 communicates by way of a radial port with an annular groove 34 formed in the circumference of the shaft 21 and said groove 34 communicates at all times through one or more ports with an annular groove 35 formed in the circumference of the fixed sleeve 22. A supporting block or bushing 36 surrounds the sleeve 22 and is fixed in a portion of the headstock wall. The block or bushing 36 is provided in its outer circumference with an annular groove 37 that is in communication with the annular groove 35 of the sleeve 22 by means of a port 38. The block or bushing 36 preferably is provided on its outer circumference on opposite sides of the groove 37 with sealing grooves in which are mounted suitable sealing means, such as well known O-rings. The annular groove 37 in the block 36 communicates with a bore 39 formed in the interior wall of the headstock and mounting therein a threaded coupling fitting 40 to which is connected an hydraulic conduit of the hydraulic circuit as will later be explained.

The input gear 17 also meshes with a forward gear 41 which like the reverse gear 18 is formed on a "forward" clutch sleeve 42 that is freely rotatable on an elongated sleeve 43 similar to the elongated sleeve 20 on the shaft 21 and keyed to a forward shaft 44 mounted in suitable bearings in the headstock and extending parallel to the power input shaft 16 and the reverse shaft 21.

A gear 45 is fixed to the elongated sleeve 43 and meshes with the gear 24 fixed to the reverse shaft 21. It will be noted that when the "reverse" clutch on the reverse shaft 21 is engaged then the elongated sleeve 43 and the forward shaft 44 will be rotated in the same direction to the rotation of the input shaft 16 through the gears 17, 18, 24 and 45, provided the "forward" clutch on the shaft 44 is disengaged.

A cup-shaped housing 46 integral with the sleeve 43 and similar to the housing 28 of the sleeve 20 contains the actuator for the clutch in the forward clutch sleeve 42. It will be understood that the clutch plates and disks in the "forward" clutch within the sleeve 42 and the actuator within the housing 46 are the same in construction as the corresponding parts of the reverse clutch on the sleeve 20.

It will further be understood that when the "forward" clutch is engaged the shaft 44 and sleeve 43 will be rotated in the opposite direction to the rotation of the power input shaft 16, the drive including the gear 17 and the gear 41.

A clutch sleeve 47 is freely rotatable on the elongated shaft 44 and is designated a "high" clutch sleeve and has formed thereon a gear 48, it being understood that said clutch sleeve 47 and gear 48 are held against axial movement relative to the elongated sleeve 43 by any suitable and desirable means.

A housing 49 for the actuator of the clutch in the sleeve 47 is integral with the elongated sleeve 43 and corresponds to the housings 28 and 46 previously described. It will also be understood that the clutch plates and disks in the sleeve 47 are similar in construction to the corresponding parts in the previously described clutches.

It will be seen that when the "high" clutch on the sleeve 43 is engaged then the gear 48 will rotate with the sleeve 43 and shaft 44, it being recalled that said sleeve 43 and shaft 44 will rotate in a forward direction and opposite to the rotation of the shaft 16 when the "forward" clutch is engaged and the "reverse" clutch on the shaft 21 is disengaged.

It will also be recalled that when the "forward" clutch is disengaged and the "reverse" clutch is engaged then the sleeve 43 and shaft 44 will be driven from the shaft 21 through the gears 24 and 45 in the reverse direction which is the same direction as the rotation of the input shaft 16.

The left hand end of the shaft 44 as viewed in Fig. 3 extends into a sleeve 50 similar to the previously described sleeve 22, while the right hand end of the shaft 44, as viewed in Fig. 3, is rotatably supported in a bearing formed in the headstock and is held against axial movement by suitable means such as the retaining collar and shoulder indicated.

In order to actuate the clutch actuators 51 and 52 in the housings 46 and 49, respectively, the following provision is made for bringing fluid pressure to the actuators. The shaft 44 is provided with an axial bore 53 which extends from adjacent the left hand end of the shaft as viewed in Fig. 3 to adjacent the gear 45.

Centrally mounted in the axial bore 53 is a tube 54 which is supported in the bore by supporting plugs so as to have between said plugs an annular chamber surrounding the tube 54. The shaft 44 to the left of the left hand plug in Fig. 3 is provided on its circumference with an annular groove 55 which communicates with the bore 53 by means of a port. The annular groove 55 communicates by means of a port in the sleeve 50 with an annular groove 56 formed in the circumference of the sleeve 50 and in turn communicating through a port 57 with an annular groove 58 formed in the circumference of a supporting block or bushing 59 fixed in the wall of the headstock.

The groove 58 communicates with a passage 60 formed in the headstock wall and to which a conduit of the hydraulic circuit is connected as will later be referred to. It will be seen that fluid pressure in said conduit will flow through the passage 60, grooves 58, 56 and 55 into the bore 53 of the shaft 44 and thence through the tube 54 until it has passed the right hand plug as viewed in Fig. 3, from whence it flows through the bore 53 and into a passage 61 that extends into the housing 49 of the high clutch actuator. The shaft 44 is provided on its circumference to the right of the left hand plug, as viewed in Fig. 3, with an annular groove 62 that communicates by means of a port with the annular space surrounding the tube 54.

The groove 62 communicates by means of a port with an annular groove 63 formed in the circumference of the sleeve 50 and said latter groove communicates by means of a passage 64 with an annular groove 65 in the circumference of the block or bushing 59. The groove 65 communicates with a passage 66 in the headstock wall which is connected to a conduit of the hydraulic circuit later to be referred to. The annular space in the shaft 44 surrounding the tube 54 communicates with a port 67 in the shaft and said port in turn communicates with a passage 68 in the sleeve 43 and leading to the actuator in the housing 46 for the "forward" clutch, wherefore it will be seen that fluid pressure can be introduced to the housing to move said actuator to effect engagement of the "forward" clutch.

Fixed to the sleeve 43 and shaft 44 to the left of the gear 41, as viewed in Fig. 3, is a gear 69 while a gear 70 is fixed to the sleeve 43 and shaft 44 to the right of the gear 45. The gear 69 meshes with a larger gear 71 formed on a "low" clutch sleeve 72 that is freely rotatable on an elongated sleeve 73 keyed to shaft 74. The gear 48 meshes with a gear 75 formed on a housing 76 for a clutch actuator later to be referred to and which housing is integral with the elongated sleeve 73 and consequently rotates with said sleeve and shaft 74. The gear 70 meshes with a gear 77 formed on a clutch sleeve 78 that is freely rotatable on the elongated sleeve 73.

It will be seen that by selectively engaging the clutches in the sleeves 72 and 78 the elongated sleeve 73 and the shaft 74 can be driven through the gears 69, 71, 48, 75 and 70, 77 at any one of three speeds relative to the shaft 44. It will be understood that the clutch plates and the clutch disks in the clutch sleeves 72, 78 which may be designated, respectively as a "low" clutch and a "medium" clutch are the same in structure as in the previously described clutches.

In addition to the housing 76 for the actuator of the clutch in the sleeve 78, the elongated sleeve 73 is provided with an actuator housing 79 for actuating the clutch in the sleeve 72. It will be understood that the actuators in the housings 76 and 79, indicated respectively at 80 and 81 are similar in construction to the actuators of the previously described clutches.

The left hand end of the shaft 74 as viewed in Fig. 3 extends into a sleeve 82 mounted in the wall of the headstock and similar to the sleeves 50 and 22 already described. It will also be understood that the shaft 74 and elongated sleeve 73 are maintained against axial displacement. The shaft 74 is provided with an axial bore 83 in which is centrally mounted an axially extending tube 84 similar to the previously described tube 54 and supported in the bore 83 by blocks mounted therein adjacent the opposite ends of the tube.

It will also be seen that intermediate the blocks there is an annular space surrounding the tube 84 and said annular space communicates by means of a radial passage 85 in the shaft and a passage 86 in the elongated sleeve 73 with the interior of the housing 79 for the actuator 81, it being noted that said passage 85 is located just to the left of the right hand plug for the tube 84 as shown in Fig. 3.

The extended end of the bore 83 to the right of the right hand end of the tube 84 (as viewed in Fig. 3) communicates with a radial passage 86 in the shaft 74 which, in turn, communicates with a passage 87 in the sleeve 73 and leading to the interior of the housing 76 for the clutch actuator 80.

The shaft 74 is provided with a circumferential groove 88 adjacent its left hand end and which communicates with the bore 83 by means of a port located to the left as viewed in Fig. 3 of the left hand block that supports the tube 84. The circumferential groove 88 communicates by way of a port with a circumferential groove 89 formed in the sleeve 82 and said groove 89 communicates by means of a passage 90 with a circumferential groove 91 formed in the supporting block or bushing 92 similar to the blocks or bushings 59 and 36 previously described.

The groove 91 is connected to a conduit of the hydraulic circuit later to be referred to. The shaft 74 to the right of the left hand block which supports the tube 84 is provided with a circumferential groove 93 that communicates with the annular space between the tube 84 and the wall of the bore 83 in the shaft 74 by means of a suitable port. The circumferential groove 93 communicates by means of a port with a circumferential groove 94 formed in the sleeve 82 and said groove 94 communicates in turn with a passage 95 in the block or bushing 92 and extending to a circumferential groove 96 which in turn is connected to a conduit of the hydraulic circuit as will later be explained.

It will be seen that hydraulic pressure can be introduced to the tube 84 through the groove 91, passage 90 and grooves 89, 88 to actuate the clutch actuator 80 in the housing 76 to engage the clutch members in the sleeve 78, so that the gear 77 will be clutched to the elongated sleeve 73 and shaft 74. Likewise it will be seen that hydraulic pressure can be introduced to the bore 83 through the groove 96, passage 95 and grooves 93 and 94 to actuate the clutch actuator 81 in the housing 79 to engage the clutch elements in the sleeve 72 to clutch the gear 71 to the elongated sleeve 73 and the shaft 74.

A gear 97 is fixed to the elongated sleeve 73 and shaft 74 intermediate the gear 71 and the sleeve 82. Also a gear 98 is fixed to the shaft 74 and elongated sleeve 73 adjacent to the right hand end of the shaft as viewed in Fig. 3.

The gear 97 meshes with a larger gear 99 formed on a clutch sleeve 100 which is freely rotatable on an elongated sleeve 101 that is keyed to a shaft 102 parallel to the shafts 74, 44, 21 and 16 and rotatably supported in the headstock in suitable bearings.

It will be understood that contained in the clutch sleeve 100 are suitable clutch plates and disks similar to the corresponding elements in the clutches previously described. The elongated sleeve 101 is provided with an integral cup-shaped housing 103 which contains therein a piston-like clutch actuator 104 for effecting engagement of the clutch elements in the sleeve 100. It will be noted that the sleeve 100 is provided with a circumferential recess to accommodate the gear 71 previously described.

The gear 98 on the shaft 74 constantly meshes with a gear 105 formed on a clutch sleeve 106 that is freely rotatable on the elongated sleeve 101 and contains clutch plates and disks similar to the elements in the previously described clutches.

The elongated sleeve 101 is provided with an integral cup-shaped housing 107 containing an actuator 108 for engaging the elements of the clutch in the sleeve 106 to connect the gear 105 to the elongated sleeve 104 and to the shaft 102.

When the drive to the shaft 102 is through the gear 99 it will be at a reduced rate compared to the shaft 74 and when it is through the gear 105 it will be at an increased rate. It will also be seen that the shaft 102 can be driven at any one of six speeds as compared to the forward shaft 44 and the reverse shaft 21, depending upon the selective engagement of the clutches on the shafts 44, 74 and 102, as already described.

The shaft 102 is provided with an axial bore 109 in which a tube 110 is centrally supported by means of circular blocks mounted adjacent the opposite ends of the tube 110. A radial port 111 in the shaft 102 communicates with the annular space between the wall of the bore 109 and the tube 110 and with a passage 112 formed in the elongated sleeve 101 and communicating with the interior of the actuator housing 103 and with the clutch actuator 104. An elongated radial port 113 in the shaft 102 communicates with the bore 109 to the right of the right hand end of the tube 110 and hence with said tube and also with a passage 114 in the elongated sleeve 101 and which passage extends to the actuator 108 in the housing 107.

The left hand end of the shaft 102 extends into a sleeve 115 similar to the sleeves 82, 50 and 22 previously described. The shaft 102 is provided with a circumferential groove 116 that communicates with the bore 109 to the left of the left hand circular block that supports the tube 110 as viewed in Fig. 4. The groove 116, in turn, communicates by way of a port in the sleeve 115 with a circumferential groove 117 formed in the sleeve 115. The circumferential groove 117 communicates through a passage 118 with a circumferential groove 119 formed in a supporting block or bushing 120 similar to the blocks or bushings 92, 50 and 36 previously described.

The annular groove 119 communicates with a passage 121 formed in the headstock and connected to a conduit of the hydraulic circuit later to be referred to. It will be seen that hydraulic pressure in the passage 121 flows through the groove 119, passage 118, grooves 117 and 116 into the bore 109 in the shaft 102 and thence through the tube 110 to the extreme right hand end of the bore 109 from whence it passes through the port 113 and passage 114 to the interior of the housing 107 to actuate the actuator 108 to engage the clutch elements in the clutch sleeve 106 and clutch the gear 105 to the elongated sleeve 101 and to the shaft 102.

The shaft 102 is provided with a circumferential groove 122 that communicates by way of a port with the annular space between the tube 110 and the wall of the bore 109 in the shaft 102, such communication occurring to the right of the left hand cylindrical supporting block for the tube 110.

The groove 122 communicates by way of a port with a circumferential groove 123 formed in the sleeve 115 and said groove 123 in turn communicates with a passage 124 extending to a circumferential groove 125 formed in the supporting block or bushing 120. The groove 125 communicates with a passage 126 formed in the headstock wall and to which passage is connected a conduit of the hydraulic circuit as will later be referred to.

It will be seen that hydraulic pressure in the passage 126 is introduced to the annular space between the tube 110 and the wall of the bore 109 in the shaft 102 by way of the groove 125, passage 124, and grooves 123 and 122. The hydraulic pressure thus introduced to the annular space referred to will flow through the radial port 111 and passage 112 into the housing 103 to actuate the actuator 104 and engage the clutch elements in the clutch sleeve 100 to clutch the gear 99 to the elongated sleeve 101 and to the shaft 102. The shaft 102 and elongated sleeve 101 has fixed thereto intermediate the gear 99 and the sleeve 115 a gear 127 which meshes with a gear 128 fixed to an elongated sleeve 129 that is keyed to a shaft 130 rotatably supported in suitable bearings in the headstock as are the previously described shafts and extending parallel to said previously described shafts.

It will be seen that the elongated sleeve 129 and shaft 130 are always driven from the shaft 102 through the gears 127, 128 at any one of six different speeds. A clutch sleeve 131 is freely rotatable on the elongated sleeve 129 and contains clutch plates and disks similar to the corresponding elements in the previously described clutches.

The sleeve 131 has formed thereon a gear 132 which thus can be clutched to the elongated sleeve 129 and shaft 130 or declutched therefrom. The sleeve 129 has formed thereon a cup-shaped housing 133 similar to the clutch actuator housings previously described and which contains the actuator 134 for the clutch elements in the clutch sleeve 131. The elongated sleeve 129 to the right of the housing 133, as viewed in Fig. 4, is provided with a gear 135 formed thereon or fixed thereto and which rotates with the elongated sleeve 129 and shaft 130 at all times.

Figure 4:
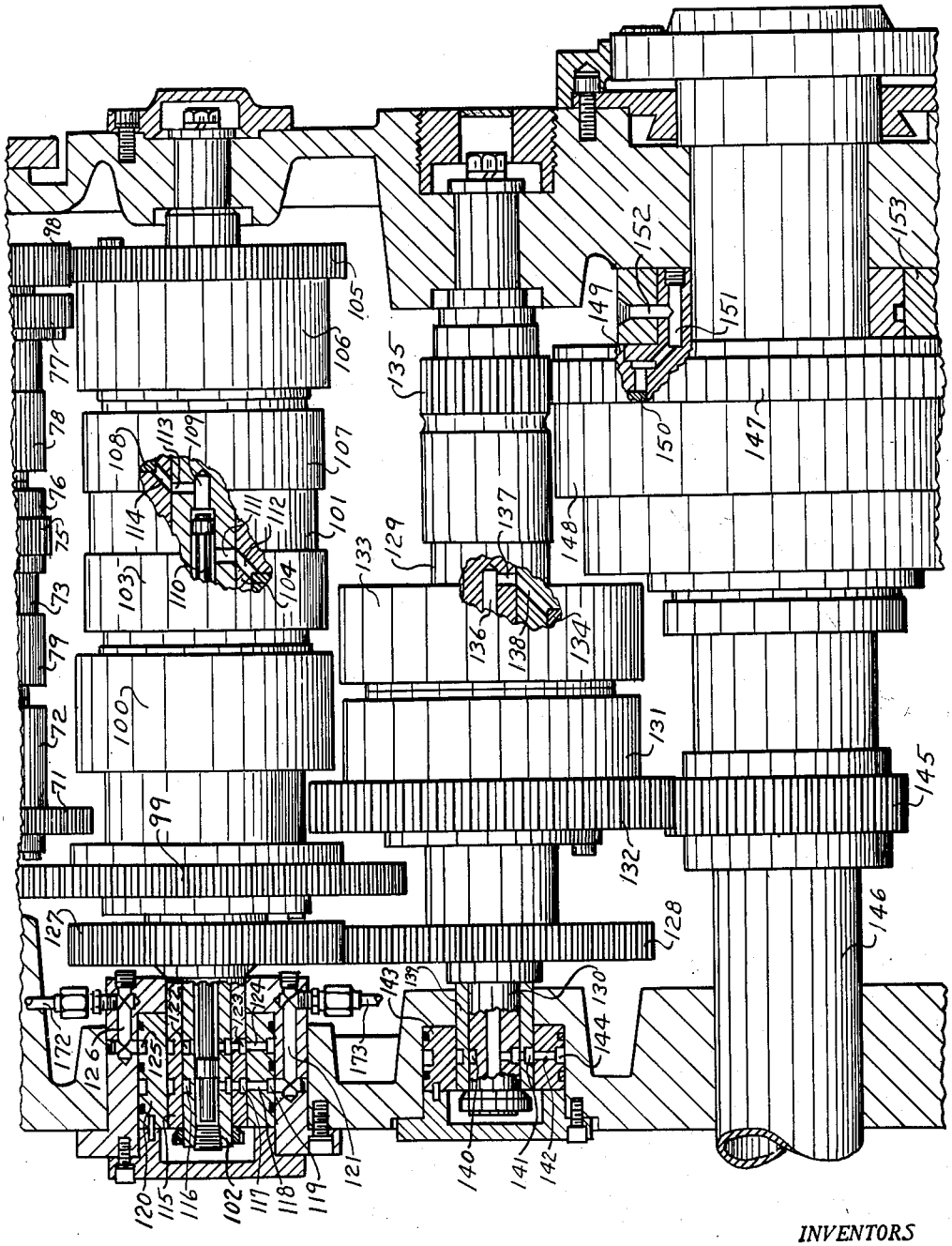
Fig. 4 is a view similar to Fig. 3 and showing the remainder of the change speed transmission and including the spindle in the headstock.

The shaft 130 is provided with an axial bore 136, the right hand end of which, as viewed in Fig. 4, communicates with a radial port 137 in the shaft 130 and which port in turn communicates with a passage 138 that extends into the housing 133 and functions to supply hydraulic pressure to the actuator 134.

The left hand end of the shaft 130 extends into a sleeve 139 similar to the sleeves 115, 82, 50 and 22 previously described. The left hand end of the shaft 130 is provided with a circumferential groove 140 that communicates by way of a port with the left hand end of the axial bore 136 that is formed in the shaft. The groove 140 in turn communicates through a port in the sleeve 139 with a circumferential groove 141 formed in said sleeve and the latter is always in communication with a passage 142 formed in a supporting block or bushing 143 that is similar to the supporting blocks or bushings 120, 92, 59 and 36 previously described.

The passage 142 communicates with a circumferential groove 144 formed in said block 143 and which groove 144 is connected to a conduit of the hydraulic circuit as will later be explained. From the description thus far set forth it will be evident that hydraulic pressure can be introduced to the bore 136 in the shaft 130 and through the port 137 and passage 138 to the housing 133 to actuate the actuator 134 to engage the clutch elements in the clutch sleeve 131 and thus to connect the gear 132 to the elongated sleeve 129 and the shaft 130.

The gear 132 constantly meshes with a smaller gear 145 fixed to the work or tool spindle 146 that is rotatably mounted in suitable bearings in the headstock and which is parrallel to the shafts 130, 102, 74, 44 and 21. It will be seen that when the gear 132 is clutched to the elongated sleeve 129 and shaft 130 that then the spindle 146 will be driven at an increased rate through the larger gear 132 and the smaller gear 145. The gear 135 fixed to the elongated sleeve 129 and shaft 130 constantly meshes with a larger gear 147 formed on a clutch sleeve 149 that is freely rotatable on the spindle 146 and which contains clutch plates and disks similar to the corresponding elements in the previously described clutches and with the clutch disks thereof fixed to the spindle 146.

A housing 149 for the actuator 150 that engages the clutch elements in the clutch sleeve 148 is carried by the wall of the headstock and is provided with an opening within which the spindle 146 rotates, said housing extending into the sleeve 148 within that portion upon which the gear 147 is formed and to the right of the clutch elements in the clutch sleeve 148.

The housing 149 is provided with a continuous passage 151 extending to the clutch actuator 150 and communicating with a passage 152 formed in part in the housing 149 and in part in a collar 153 fixed on a cylindrical portion of the housing and within which portion the spindle 146 rotates.

A conduit of the hydraulic circuit as later will be explained is connected to the end of the passage 152 in the collar 153 and it will be seen that hydraulic pressure can flow from the conduit through the passages 152, 151 to the clutch actuator 150 to engage the clutch elements in the clutch sleeve 148 and thus drive the spindle 146 from the gear 135 through the gear 147 at a reduced rate.

From the foregoing description it will be evident that the spindle 146 can be driven at any one of twelve different speeds from the forward shaft 44 or at any one of twelve different speeds from the reverse shaft 21, depending upon the selective engagement of the clutches herein described.

It will be noted that the arrangement of the shafts, clutches and gearing is such that the change speed transmission is compact and can be contained in a headstock of relatively small size notwithstanding the fact that the transmission provides for imparting to the work spindle a comparatively large number of different speeds. As will be later pointed out, certain of the clutches in the transmission can be simultaneously engaged to provide a braking arrangement for the rotating spindle and such arrangement requires no additional brake mechanism and is perfectly safe in that the clutches being friction clutches provide the necessary slippage in case of overload. Also it will later be pointed out that by simultaneously disengaging certain of the clutches in the transmission and particularly the clutches in the clutch sleeves 131 and 148 a neutral arrangement of the transmission can be selected and one wherein the spindle 146 is a "free" spindle as is often desired in the operation of a machine tool.

The clutches hereinbefore described may be engaged and disengaged in various ways as, for instance, by electrically or mechanically operated actuators and control mechanisms for selecting or preselecting the spindle speeds, although for purposes of illustration the clutches have been shown as actuated and controlled hydraulically.

Referring to Fig. 5, a hydraulic circuit is schematically illustrated and includes a pump 154 connected by conduit 155 with a sump 156. The pump may be driven from the main drive motor 14 or from an independent drive source as will be well understood. The output side of the pump is connected to a conduit 157 which, in turn, is connected by a branch conduit 157a to the central bore or passage in the rotatable valve body of a main control valve indicated generally at C and later to be described in greater detail.

The pressure line conduit 157 may also be connected by a short branch pressure line 157b to a pressure gauge 158. The main pressure line conduit 157 extends to a speed selector or preselector valve indicated generally at S and containing a plurality of shiftable two-position valves with two of said two-position valves being connected with the main pressure line 157 by branches 157c and 157d.

The rotatable valve body of the main control valve C which is mounted on the front of the headstock is provided with a forwardly extending shaft portion 159, to the outer end of which is connected an operating lever 160, see Figs. 1 and 6, conveniently located on the front of the headstock. The speed selector or preselector valve S is controlled and actuated through the medium of a shaft 161 which is rotatable to select or preselect the spindle speeds and is axially shiftable to obtain the selected or preselected speeds and extends into the housing of the speed selector or preselector valve and is provided on its outer end with an operating wheel or knob 162, see Figs. 1, 5 and 11, it being noted that the speed selector or preselector valve is mounted on the top of the headstock and also that the hand wheel or knob 162 is within easy reach of the operator from his position in front of the machine as is also the lever 160 of the main control valve.

The fitting 40 that is screwed into the passage 39 is connected to a conduit 163 that extends to and is operatively connected with the main control valve wherefore when said main control valve is properly positioned hydraulic pressure can be introduced to the bore 33 in the reverse shaft 21 to actuate the clutch actuator 29 and engage the clutch elements in the "reverse" clutch sleeve 19 to clutch said sleeve and the gear 18 to the elongated sleeve 20 and the reverse shaft 21. A conduit 164 is connected to the passage 66 and extends to the main control valve C, wherefore hydraulic pressure can be caused to act on the actuator 51 for the clutch elements in the "forward" clutch sleeve 42 to connect said sleeve and the gear 41 with the forward shaft 44.

A conduit 165 extends between the main control valve C and the speed selector or preselector valve S and, as will later be explained, functions when the main control valve is in neutral position to effect simultaneous disengagement of the "high" clutch on the shaft 130 which is associated with the gear 132 and the "low" clutch on the spindle 146 which is associated with the gear 147, thus providing for a "free" spindle. At this time certain of the other clutches in the transmission will be disengaged and certain thereof engaged as will later become apparent.

A conduit 166 extends from the main control valve C to the speed selector or preselector valve S so that when the main control valve is in the brake position simultaneous engagement of any two of the "high" "low" and "medium" clutches on the shafts 44 and 74 can take place to simultaneously operatively connect any two of the gears 48, 71 and 77 with the respective shafts 44 and 74, it being noted that such simultaneous connection of the gears with their shafts will act in opposition and as a brake due to the different gear ratios and since either the gear 99 or the gear 105 on the shaft 102 will be connected to its shaft as will also either the gear 132 on shaft 130 or gear 147 on the spindle 146, a braking action to the rotation of the spindle will be provided without necessitating any separate braking mechanism.

The main control valve C has its drain port connected by a conduit 167 with the sump while the drain ports of the speed selector or preselector valve are connected to sump by a conduit 168. The passage 60 is connected with a conduit 169 that extends to the speed selector or preselector valve and since said passage 60 is in communication with the actuator 52 for the "high" clutch elements in the sleeve 47 on the shaft 44 said "high" clutch can be engaged or disengaged hydraulically to operatively connect or disconnect the gear 48 with the forward shaft 44.

A conduit 170 interconnects the annular groove 95 with the speed selector or preselector valve and hence hydraulic operation of the actuator 81 for the clutch elements in the "low" clutch sleeve 72 on shaft 74 can be effected to control the connection and disconnection of the gear 71 with respect to said shaft.

A conduit 171 interconnects the annular groove 91 with the speed selector or preselector valve, wherefore the actuator 80 for the clutch elements in the sleeve 78 can be controlled to effect connection and disconnection of the medium gear 77 with respect to the shaft 74.

A conduit 172 interconnects the passage 126 with the speed selector or preselector valve S, wherefore the actuator 104 for the clutch elements in the sleeve 100 can be actuated and controlled hydraulically to effect connection and disconnection of the low gear 99 with respect to the shaft 102.

A conduit 173 interconnects the passage 121 with the speed selector or preselector valve S, wherefore the actuator 108 for the clutch elements in the sleeve 106 can be operated and controlled to effect connection and disconnection of the high gear 105 relative to the shaft 102.

A conduit 174 interconnects the annular groove 144 with the speed selector or preselector valve S, wherefore the actuator 134 for the clutch elements in the clutch sleeve 131 can be hydraulically operated and controlled to effect connection and disconnection of the high gear 132 relative to the shaft 130.

A conduit 175 interconnects the passage 152 with the speed selector or preselector valve S, wherefore the actuator 150 for the clutch elements in the clutch sleeve 153 can be operated and controlled hydraulically to effect connection and disconnection of the low gear 147 with respect to the spindle 146.

A detailed description of the main control valve C will now be given, with particular reference to Figs. 6 to 10 inclusive, wherein the valve is illustrated in the position taken when its operating lever 160 is set in the neutral position.

The main control valve comprises a housing 176 secured in an opening in the front of the headstock and having therein a valve chamber in which rotatably fits the valve body 177 that is integral with or connected to the outwardly extending shaft 159 to which the operating handle 160 is connected.

The valve casing or housing 176 is provided with a passage 178 that communicates with the valve chamber and to which passage the drain conduit 167 is connected, see Figs. 6 and 7. The valve housing or casing 176 is provided with three passages 179, 180 and 181 communicating with the valve chamber and connected, respectively, with the conduits 163, 164 and 166 which extends to the "reverse" clutch on the shaft 21, the "forward" clutch on the shaft 44 and to the speed selector or preselector valve S for establishing the brake circuit.

The valve housing or casing 176 is provided with a passage 182 communicating with the valve chamber and connected to the conduit 165 which extends to the speed selector or preselector valve S and functions in the neutral position of the main control valve for obtaining the "free" spindle (see Fig. 9). The valve housing or casing 176 is provided with a passage 183 communicating with the valve chamber and connected to the branch pressure supply line 157a, see Figs. 6 and 10.

The valve body 177 is provided with a circumferential groove 184 which is always in communication with the passage 183 and the branch pressure supply line 157a, see Fig. 10. The valve body 177 has a diametrically extending passage 185 communicating at its opposite ends with the groove 184 and at its midpoint with a centrally located bore 186 that extends axially of the valve body toward the front of the headstock.

The valve body 177 in the transverse plane thereof indicated in Fig. 9 is provided with a diametrically extending passage 187 which communicates intermediate its ends with the axial bore 186 while its opposite ends terminate in enlarged recessed or scalloped portions 188 formed in the circumference of the valve body. The valve body in this plane also is provided with a diametrically extending passage 189 displaced a predetermined angle with respect to the passage 187.

In the transverse plane of the valve body shown in Fig. 8 said body is provided with a diametral passage 189 which communicates with the axial bore 186. Also the valve body in this plane is provided on its circumference with a plurality of axially extending circumferentially elongated concavities or grooves 190, there being four such grooves provided as clearly shown in Fig. 8. The grooves 190 extend axially of the valve body toward the front of the headstock in the plane indicated in Fig. 7 and communicate with a circumferential groove 191 formed in the valve body and always in communication with the passage 178 in the valve housing or casing and which passage, it will be recalled, is connected to the drain conduit 167.

The passage 182 shown in Figs. 6 and 9 is connected intermediate its ends to a passage 192 formed in the valve casing or housing 176 and extending axially thereof toward the front of the headstock and provided at its forward end with an angled portion communicating with the valve chamber. The said angled portion of the passage 192 in the neutral position of the valve body registers and communicates with a passage 193 formed in the valve body and extending to the circumferential groove 191 that is always connected to the drain conduit 167.

It will be seen that in all positions of the valve body except neutral position the passages 192 and 193 are out of communication with each other and said passage 192 at such times is deadended by the valve body.

The speed selector or preselector valve S comprises four two-position valves. The valve body or casing 194 is provided with a valve chamber 195 having longitudinally spaced enlarged portions 196 and 197 which are connected, respectively, to the conduits 171 and 169 that extend to the "medium" clutch on the shaft 74 and to the "high" clutch on the shaft 44. Slidable in the valve chamber 195 is a valve body 198 having annular cutaway portions 199 and 200 with the valve body adjacent such cutaway portions constituting lands. The valve chamber 195 is in communication intermediate the enlarged portions 196 and 197 thereof with a passage 201 formed in the casting or valve body 194 and extending to a valve chamber shortly to be described.

It will be seen that when the valve body 198 is in the position shown in Fig. 11 then conduit 171 is in communication through the valve chamber with passage 201 and conduit 169 is in communication with a drain conduit 168. It will also be apparent that when the valve body 198 is shifted toward the right to its second operative position that then the conduit 169 will be in communication through the valve chamber with the passage 201 and conduit 171 is in communication with a second drain conduit 168.

The valve body or casting 194 contains a second valve chamber 202 extending parallel to the valve chamber 195 and provided with enlarged portions 203 and 204. The enlarged portion 203 communicates with the conduit 170 that extends to the "low" clutch on the shaft 74. The enlarged portion 204 of the valve chamber 202 communicates with the passage 201 which, in turn, communicates with the previously described valve chamber 195. A valve body 205 is slidable in the chamber 202 to either one of two operative positions and is provided with two cutaway portions 206 and 207, with the body adjacent to said portions forming valve lands. The valve chamber 202 on opposite sides of the enlarged portions 203 and 204 thereof communicates with the conduit 166 that extends from the speed selector or preselector valve to the passage 181 in the housing 176 of the main control valve C, i. e., the brake position of the main control valve. The valve chamber 202 intermediate the enlarged portions 203 and 204 thereof communicates with the pressure line 157 through the branch conduit 157c.

It will be seen that when the valve body 205 is in the position shown in Fig. 11 that then hydraulic pressure in line 157c is free to flow into the chamber 202, the enlarged portion 203 thereof and thence through the conduit 170 to the "low" clutch on the shaft 74. At this time the enlarged portion 204 of the valve chamber 202 is out of communication with the pressure line 157c and communicates with the passage 201 and with the conduit 166. Also at this time the valve chamber 202 to the left of the enlarged portion 203 is in communication with the conduit 166. When the valve body 205 is shifted to the right to its second operative position then passage 201 communicates through the enlarged portion 204 of the valve chamber 202 with the pressure line 157c while the enlarged portion 203 of the valve chamber 202 is out of communication with the pressure line 157c and in communication with the conduit 166 and the latter hence is in communication with the conduit 170.

It will be seen that the positions of the valve bodies 198 and 205 are interrelated to control the "high" clutch on the shaft 44 and the "medium" and "low" clutches on the shaft 74 and this is for the purpose of obtaining a braking arrangement which will be further explained.

The body or casting 194 of the speed selector or preselector valve S is further provided with a valve chamber 208 similar and parallel to the valve chambers 195 and 202 and having spaced enlarged portions 209 and 210. The enlarged portion 209 communicates with the conduit 172 that extends to the "low" clutch on the shaft 102. The enlarged portion 210 communicates with the conduit 173 that extends to the "high" clutch on the shaft 102. The valve chamber 208 to the left of the enlarged portion 209 thereof communicates with drain 168 as does also the valve chamber to the right of the enlarged portion 210 thereof as viewed in Fig. 11.

A valve body 211 is slidable in the chamber 208 to either one of two operative positions and is provided with two cutaway portions 212 and 213 with the valve body adjacent said portions constituting lands. When the valve body 211 is in the operative position shown in Fig. 11 then the conduit 172 is in communication with the pressure line 157d through the valve chamber 208 and the enlarged portion 209 thereof. When the valve body 211 is shifted to the right to its second operative position then communication between the conduits 157d and 172 is closed off and the conduit 172 is in communication with the drain conduit 168. At this time the conduit 173 which communicates with the enlarged portion 210 of the valve chamber has been disconnected from its communication with drain conduit 168 and placed in communication through the valve chamber with pressure line conduit 157d. The casting 194 of the speed selector or preselector valve is provided with a fourth valve chamber 214 similar to the valve chambers previously described and extending parallel thereto and provided with longitudinally spaced enlarged portions 215 and 126.

The enlarged portion 215 of the valve chamber 214 communicates with conduit 175 that extends to the "low" clutch on the spindle 146. The enlarged portion 216 of the valve chamber 214 communicates with conduit 174 that extends to the "high" clutch on the shaft 139. The valve chamber 214 intermediate the enlarged portions 215 and 216 thereof communicates with the conduit 165 that extends to the passage 182 in the housing 176 of the main control valve C and which in the neutral position of the main control valve functions as a drain conduit.

The valve chamber 214 to the left of the enlarged portion 215 and to the right of the enlarged portion 216 communicates with the drain conduit 168. A valve body 217 is slidable in the valve chamber 214 and is provided with longitudinally spaced cutaway portions 218 and 219 with the valve body adjacent to said cutaway portions forming valve lands. When the valve body 217 is in the first of its two operative positions as indicated in Fig. 11, then conduit 175 communicates with conduit 165 and when said valve body 217 is moved to the right to its second operative position then conduit 174 communicates with conduit 165 and is out of communication with drain conduit 168 while conduit 175 is in communication with drain conduit 168.

In order to shift the valve bodies 198, 205, 211 and 217 to effect engagement of the various clutches in the transmission other than the "forward" and "reverse" clutches so as to obtain the different selected or preselected speeds for the spindle the following mechanism may be employed: The shaft 161 which carries the hand wheel or knob 162 is slidably and rotatably supported intermediate its ends by a bracket 220 carried by the casting 194 of the speed selector or preselector valve and at its inner end said shaft 161 slidably and rotatably interfits a bore 221 formed in a portion 222 of the casting 194. The bore 221 slidably mounts a tapered head 223 having a reduced shank or pin portion and said head 223 engages the inner end of the shaft 161. A coil spring 224 surrounds said pin or shaft within the bore 221 and the one end abuts the head 223 and at the opposite end abuts a threaded plug 225 screwed into the threaded end of the bore 221. The spring 224 and head 223 act on the shaft 161 to move the same toward its outermost sliding position and to maintain the shaft in such position until it is moved inwardly by force which overcomes the action of the spring 224. It will be understood that the lowermost disk 226 in Fig. 11 determines the outward limit of movement of the shaft 161 by its engagement with bracket 220.

The shaft 161 has fixed thereto four axially spaced similar disks 226. The circumferences of the disks 226 are provided with a plurality of inwardly extending circumferentially spaced recesses 227, it being understood that the number, the spacing and the width of said recesses 227 will be determined in relation to the speeds to be selected or preselected by the speed selector or preselector valve and that the arrangement and dimensions of the recesses on the various disks 226 will vary.

Four rocker members 228 have hub portions 229 which are pivotally supported on shafts 230 carried, respectively, by four spaced supporting arms or brackets 231 extending from the casting 194 and one of which is shown in Fig. 13.

The rocker members 228 each has spaced parallel arms 232 and 233 at the ends of which are mounted pins 234 extending toward the disks 226 and adapted to project into the recesses 227 or to engage the adjacent surfaces of the disks when the shaft 161 is moved inwardly against the action of the spring 224 as clearly indicated in Figs. 11 and 12, wherein it will be noted that a rocking movement is imparted to the rocker members when one of the pins 234 extends into a recess 227 and the other pin 234 engages the adjacent surface of the disk 226.

Each rocker 228 is provided with a valve body actuating arm 235 which extends into a slot 236 in the valve body correlated to a particular rocker 228, it being noted that the actuating arms 235 adjacent their free ends are provided with rounded surfaces so as to impart endwise sliding movement to the valve bodies 198, 205, 211 and 217 without lost motion.

A particular speed for the spindle 146 may be selected or preselected by the operator by turning the hand wheel 162 and the shaft 161 when said shaft is held in its outermost position under the action of the spring 224, at which time the disks 226 are spaced from the pins 234 of the rockers and are free to rotate with the shaft without affecting the rockers. It will be understood that a suitable dial is provided whereby the operator can determine the particular position of the shaft and disks with relation to a particular speed, wherefore during one operative step of the machine the operator can preselect the spindle speed for the following operative step.

It will also be understood that suitable means, such as a spring point and cooperating recesses or notches will be provided to hold the shaft 161 and disks 226 in their adjusted rotative position. When an operative step is terminated the operator pushes inwardly on the shaft 161 to move the disks toward the pins of the rockers, whereupon certain of the pins will extend into the recesses 227 while other of the pins will engage the adjacent planular surface of the disks, with the result that certain or all of the rockers will be rocked in a predetermined manner to shift certain or all of the valve bodies 198, 205, 211 and 217 to set said valve bodies in the proper position to obtain the preselected speed.

Assuming that the lever 160 of the main control valve is in the neutral position, i. e., the position represented in Figs. 6 to 10 inclusive, it will be seen that at such time the spindle 146 will be entirely disconnected from the transmission and will be a "free" spindle so it can be freely turned for loading and other purposes.

Referring to Figs. 5 to 10 inclusive, it will be noted that when the lever 160 is in neutral position the conduits 163 and 164 are disconnected from the pressure side of the hydraulic circuit and are connected to drain conduit 167 through the recesses 190 in the valve body. Hence at such time the "reverse" clutch on the reverse shaft 21 and the "forward" clutch on the forward shaft 44 are disengaged and the main drive motor 14 is imparting no power to the transmission. This condition is clearly illustrated in Figs 6 and 8. Also at this time conduit 165 is disconnected from the pressure side of the circuit (see Fig. 9) and is connected through passages 192, 193, annular groove 191 and passage 178 with drain conduit 167. Therefore reference to Fig. 11 will show that conduit 175 which extends to the "low" clutch on the spindle 146 is connected to drain through the valve chamber 214 and conduit 165.

In addition, at this time conduit 174 which extends to the "high" clutch on shaft 130 is connected to drain 168 through valve chamber 214. Consequently the gear 147 is disconnected from the spindle 146 and the gear 132 is disconnected from the shaft 130 and hence the spindle 146 is completely disconnected operatively from the transmission and a condition of "free" spindle exists.

Furthermore, it will be seen that should the valve body 217 be in its other and right hand operative position when the main control valve is in neutral position, that then the conduit 175 is connected through the valve chamber 214 with drain conduit 168 while the conduit 174 is connected through the valve chamber with conduit 165 and hence the same condition obtains irrespective of which operative position the valve body 217 might be put in.

When the main control valve is in neutral position and the speed selector or preselector valve of Fig. 11 is in the position indicated therein, the "high" clutch controlling the gear 48 on the shaft 44 is disengaged since the conduit 169 is connected through the enlarged portion 197 of the valve chamber 195 with drain conduit 168. At this time, however, the "low" clutch on shaft 74 will be engaged since conduit 170 is connected through valve chamber 202 with pressure line 157c. Also at this time the "medium" clutch on shaft 74 and controlling gear 77 will be disengaged since conduit 171 is connected through the valve chambers 195 and 202 with conduit 166 that extends to passage 181 in the main control valve housing 176 (see Fig. 8) and said latter passage is connected through recess 190 with groove 191, passage 178 and drain conduit 167. Also at this time "low" clutch on shaft 102 and which controls gear 99 will be engaged since conduit 172 is connected through valve chamber 208 with pressure line conduit 157d. However, at this time the "high" clutch on shaft 102 and which controls gear 105 will be disengaged since conduit 173 is connected through the valve chamber 208 and particularly enlarged portion 210 thereof with the drain conduit 168.

The fact, however, that certain of the speed changing clutches on the shafts 44, 74 and 102 will be engaged in the neutral position of the main control valve, does not affect the "free" spindle condition existing since the "high" clutch on shaft 130 and the "low" clutch on spindle 146 will always be disengaged at this time.

Assuming that when the main control valve is in neutral position, the valve body 198 is in the other of its operative positions than that shown in Fig. 11, then conduits 169 and 171 will still be connected to drain and the "high" clutch on shaft 44 and the "medium" clutch on shaft 74 will be disengaged.

Assuming that valve body 205 is in the other of its operative positions than that shown in Fig. 11 when the main control valve is in neutral, then conduit 170 will be connected to drain through conduit 166 and "low" clutch on shaft 74 will be disengaged, while "medium" clutch on shaft 74 will be engaged, since conduit 171 will be connected to pressure line 157. At this time "high" clutch on shaft 44 is disengaged since conduit 169 is connected to drain.

Assuming that both valve bodies 198 and 205 have been shifted to their other operative positions than the one shown in Fig. 11 and the main control valve is in neutral position, then "high" clutch on shaft 44 will be engaged as conduit 169 is connected to pressure while the "low" and "medium" clutches on shaft 74 will be disengaged since conduits 170 and 171 will be connected to drain.

Assuming that when the main control valve is in neutral position, that valve body 211 is shifted to the other of its operative positions than that shown in Fig. 11, then conduit 173 will be connected to pressure line 157d and the "high" clutch on shaft 102 will be engaged while the "low" clutch on said shaft is disengaged since conduit 172 will now be connected to drain conduit 168.

Assuming that the lever 160 of the main control valve is in the forward position and valve body 177 has been rocked counterclockwise from the position shown in Figs. 6 to 10 inclusive, diametral passage 189 of the valve body will register with passage 180 in the valve housing and hence conduit 164 to the "forward" clutch on shaft 44 will now be connected through the valve body to pressure line 157a and said clutch will be engaged. At this time passage 179 in the valve housing 176 will still be in communication with a recess 190 and will be connected to the annular groove 191 in the valve body and through passage 178 with drain conduit 167, and hence conduit 163 will be draining and "reverse" clutch on shaft 21 will be disengaged. Also at this time passage 189 in the valve body 177 will be in communication with conduit 165 and hence the latter will be connected to the pressure side of the circuit and therefore either the "high" clutch on shaft 130 or the "low" clutch on the spindle 146 can be engaged depending upon the position of the valve body 217 of the speed selector or preselector valve shown in Fig. 11.

It will be recalled that passage 192 in the housing 176 of the main control valve is now out of registry with passage 193 in the valve body 177 and hence said passage 192 is not connected to drain. Also at this time conduit 166 will be connected to drain through a recess 190 in the valve body 177 and hence pressure from the line 157c can be supplied selectively to conduits 170, 171 and 169, depending upon the adjusted position of valve bodies 205 and 198 of the speed selector or preselector valve. This is also true with respect to conduits 172 and 173 which selectively can receive pressure from the line 157d, depending upon the adjusted position of the valve body 211.

It will thus be seen that when the "forward" clutch is engaged the "reverse" clutch will be disengaged while the engagement or disengagement of the other clutches in the transmission will be effected through the setting and actuation of the speed selector or preselector valve to produce the desired speed for a particular operative step. The same situation obtains when the main control valve is in reverse position, that is, when it has been rotated in a clockwise direction as viewed in Fig. 8 to bring the diametral passage 189 into communication with the passage 179 and the conduit 163 to subject the "reverse" clutch to the pressure side of the circuit. At this time the "forward" clutch will be draining through a recess 190 in the valve body as will also conduit 166. Furthermore, at this time conduit 165 will be in communication through an enlarged end 188 with the passage 187 in the main control valve body 177 and hence will be subject to hydraulic pressure.

When the main control valve is moved by the lever 160 to "brake" position the valve body 177 will be rotated in a clockwise direction from the position shown in Figs. 6 to 10 inclusive to place the conduit 165 in communication through an enlarged end 188 with the diametral passage 187 in the valve body and hence in communication with the pressure side of the circuit. Therefore, either the "low" clutch on the spindle 146 or the "high" clutch on the shaft 130 will be engaged, depending upon the position of the valve body 217 of the speed selector or preselector valve. Hence the spindle 146 will be operatively connected through the shaft 130 and gears 128 and 127 with the shaft 102. At this time either the "low" or the "high" clutch on shaft 102 will be engaged, depending upon the position of valve body 211 of the speed selector or preselector valve and hence the spindle will be operatively connected with shaft 74, since shaft 102 will be connected to shaft 74 either through gears 99, 97 or 105, 98. At the time under discussion the clockwise rotation of valve body 177 of the main control valve will have placed conduit 166 in communication with diametral passage 189 and hence with the pressure side of the circuit. Therefore if valve bodies 205 and 198 of the speed selector or preselector valve are in the position shown in Fig. 11 conduit 170 will be connected to pressure conduit 157 and the "low" clutch on shaft 74 will be engaged. Also conduit 166 which is now a pressure conduit will be connected through valve chamber 202, passage 201 with valve chamber 195 and thence with conduit 171, wherefore the "medium" clutch on shaft 74 will also be engaged.

Supposing that valve body 205 of the speed selector or preselector valve is shifted to its other operative position than shown in Fig. 11, while body 198 remains in its illustrated position, then conduit 170 will be connected to conduit 166 which is now a pressure conduit and the "low" clutch on shaft 74 will be engaged. Also at this time pressure line 157 will be connected through valve chamber 202 and passage 201 with valve chamber 195 and with conduit 171, wherefore the "medium" clutch on shaft 74 is engaged. In other words, shifting of valve body 205 from the position shown in Fig. 11 to its other operative position when the main control valve is in "brake" position will not alter the situation of having both the "low" and "medium" clutches on shaft 74 simultaneously engaged.

Now supposing that valve body 198 is shifted to its other operative position from that shown in Fig. 11 when the main control valve is in "brake" position but that valve body 205 remains in its illustrated position, then the "low" clutch on shaft 74 is engaged while the "high" clutch on shaft 44 is engaged and the "medium" clutch on shaft 74 is disengaged. Now further assuming that both valve bodies 198 and 205 have been shifted to their other operative positions than the ones illustrated in Fig. 11 when the main control valve is in "brake" position, then the "low" clutch on shaft 74 will be engaged as will also the "high" clutch on shaft 44, while the "medium" clutch on shaft 74 will be disengaged. It will be seen consequently that irrespective of the operative positions of the valve bodies 198 and 205 the "low" clutch on shaft 74 will be engaged when the main control valve is in the "brake" position and also that the "medium" clutch on shaft 74 of the "high" clutch on shaft 44 will be simultaneously engaged. Consequently two separate gear trains of different size will be simultaneously engaged and will act in opposition to each other to prevent or brake rotation of the shafts 74, 102, 130 and the spindle 146. This braking arrangement can be safely utilized inasmuch as all of the clutches are friction clutches and any overloading of the parts will merely produce slippage in the clutches and will not damage the parts, it being understood that the hydraulic pressure acting on the simultaneously engaged clutches will be of predetermined amount so as to allow this necessary slippage.

It will have been seen that the speed changes can be effected without the necessity of disconnecting the input shaft from the transmission since the clutches are friction clutches and can be engaged and disengaged with the power applied to the transmission and since there are no gears to shift the change from one speed to another will be effected silently.

It will also be understood that when the machine is operating at one speed in an operative step of the work cycle the operator can preselect the spindle speed for the next operative step merely by indexibly turning the hand wheel 162 of the speed selector or preselector valve to the desired speed position. Then upon completion of the one operative step, assuming there is to be no change in the direction of rotation of the spindle, the operator obtains the preselected speed for the succeeding operative step merely by moving the hand wheel 162 and the shaft 161 axially inwardly to cause the disks 226 to rock the rockers 228 in a predetermined manner to shift one or more of the sliding valves contained in the speed selector or preselector valve. This inward movement of the shaft 161 and wheel 162 sets up the hydraulic circuit to engage or disengage in a predetermined way the various clutches to obtain the preselected speed. The operator after pushing the hand wheel 162 and the shaft 161 inwardly to obtain the preselected speed merely releases the hand wheel whereupon the spring pressed plunger 223 restores the shaft 161 to its outwardly moved position wherein it can be rotatably indexed again to preselect the spindle speed for the next operative step in the work cycle. Of course if the spindle has been rotating in one direction during one operative step and it is desired to have it rotate in the opposite direction during the next operative step the operator, in addition to moving the hand wheel 162 and shaft 161 inwardly to obtain the preselected spindle speed, must also move the control lever of the main control valve from "forward" position to "reverse" position or vice versa as the case might be.

From the foregoing detailed description it will be apparent that the objects and advantages of the invention hereinbefore enumerated are adequately obtained by a construction embodying the invention.

Although a preferred embodiment of the invention has been illustrated and described herein, it will be understood that the invention is susceptible of various changes and modifications thereover and which come within the scope of the appended claims.

Having thus described our invention, we claim:

1. In a change speed transmission adapted to be used in a machine tool headstock having a power input shaft and a rotatable driven member such as a spindle, a rotatable shaft parallel to said input shaft and driven member and having gears fixed thereto adjacent its opposite ends and a pair of gears freely rotatable thereon intermediate said fixed gears with one of said freely rotatable gears operatively connected with said input shaft, separate clutch means on said rotatable shaft engageable to interconnect said freely rotatable gears therewith, an intermediate shaft parallel to said input shaft and said rotatable shaft and provided with gears freely rotatable thereon and constantly meshing with said fixed gears on said rotatable shaft, separate clutch means engageable to interconnect said last mentioned freely rotatable gears with said intermediate shaft, a gear on said intermediate shaft intermediate the freely rotatable gears thereon and meshing with the other freely rotatable gear on said rotatable shaft, end gears fixed to said intermediate shaft and located thereon outwardly of said freely rotatable gears on said intermediate shaft, and gear means operatively interconnecting said fixed gears on said intermediate shaft with said driven member.

2. In a change speed transmission as defined in claim 1 and wherein the clutch means for interconnecting said other freely rotatable gear on said rotatable shaft with said shaft and the separate clutch means for interconnecting the freely rotatable gears on said intermediate shaft with said shaft are friction clutches.

3. In a change speed transmission as defined in claim 1 and wherein the clutch means on said rotatable shaft and said intermediate shaft are friction clutches and power means is provided for engaging said friction clutches.

4. In a change speed transmission as defined in claim 3 and wherein said power means includes a control device indexible during a current operation of the transmission to preselect the clutch means to be engaged in the following operation of the transmission and movable endwise at the end of said current operation of the transmission to obtain the preselected clutch means engagement.

5. In a change speed transmission as defined in claim 3 and wherein said power means is hydraulic means and includes a hydraulic circuit having therein a control valve indexible to preselect during a current operation of the transmission the clutch means engagement for the following operation thereof and movable at the end of said current operation of the transmission to obtain the preselected clutch means engagement for the following operation of the transmission.

6. In a change speed transmission as defined in claim 5 and wherein said control valve includes a plurality of shiftable valve bodies, individual rocker members for shifting said bodies and individual elements normally out of contact with said rocker members and indexible to preselect clutch means engagement and movable axially into contact with said rocker means to rock the same and shift said valve bodies to obtain the preselected clutch means engagement.

7. In a change speed transmission adapted to be used in a machine tool headstock having a power input shaft and a rotatable driven member such as a spindle, a reverse shaft having a gear freely rotatable thereon and operatively connected with said input shaft, clutch means on said reverse shaft engageable to interconnect said freely rotatable gear therewith, and a gear fixed to said reverse shaft, a forward shaft having a pair of gears freely rotatable thereon and one of which is operatively connected with said input shaft, separate clutch means on said forward shaft engageable to interconnect said freely rotatable gears thereon with said forward shaft, an end gear fixed to said forward shaft and located outwardly of said one freely rotatable gear, a second gear fixed on said forward shaft and located outwardly of the other of said freely rotatable gears thereon and meshing with the gear fixed on said reverse shaft, an end gear fixed on said forward shaft outwardly of said second gear fixed thereon, an intermediate shaft parallel to said previously mentioned shafts and having fixed thereto a gear meshing with the other of the freely rotatable gears on said forward shaft, freely rotatable gears on said intermediate shaft on the opposite sides of said fixed gear thereon and meshing with the fixed end gears on said forward shaft, clutch means engageable to interconnect said freely rotatable gears with said intermediate shaft, end gears fixed to said intermediate shaft adjacent the ends thereof and outwardly of said freely rotatable gears thereon, and gear means interconnecting said end gears on said intermediate shaft with said driven member.

8. In a change speed transmission as defined in claim 7 and wherein said clutch means are friction clutches and hydraulic power means is provided for actuating said clutches and including a control device indexible to preselect during a current operation of the transmission engagement of certain of said clutches for the following operation of the transmission and movable at the end of of said current operation of the transmission to obtain the preselected clutch means engagement.

9. In a change speed transmission as defined in claim 7 and wherein the gear ratios of the other freely rotatable gear on the forward shaft and its intermeshing fixed gear on the intermediate shaft is different from the gear ratios of the freely rotatable gears on the intermediate shaft and their intermeshing fixed gears on the forward shaft, while power means is provided for actuating said clutch means and including a power circuit having therein a control device such that any two of the two clutch means on the intermediate shaft and the clutch means for the other freely rotatable gear on the forward shaft can be simultaneously engaged to produce a braking action to the rotation of said shafts and said driven member because of the different gear ratios of the opposing gear trains.

10. In a change speed transmission as defined in claim 7 and wherein the gear means interconnecting the end gears on the intermediate shaft with the driven member includes a second intermediate shaft having thereon a pair of freely rotatable gears meshing with the fixed end gears on said intermediate shaft, clutch means on said second intermediate shaft engageable to interconnect said freely rotatable gears thereon with said second intermediate shaft and an end gear fixed on said second intermediate shaft outwardly of one of said freely rotatable gears thereon.

11. In a change speed transmission as defined in claim 10 and wherein said gear means which interconnects said end gears on said intermediate shaft with said driven member further includes a third intermediate shaft having thereon fixed gears one of which constantly meshes with the fixed end gear on the second intermediate shaft, a freely rotatable gear on said third intermediate shaft intermediate the fixed gears thereon, and clutch means on said third intermediate shaft engageable to interconnect said freely rotatable gear with said shaft; and a fixed gear on said driven member intermeshing with the freely rotatable gear on said third intermediate shaft, a freely rotatable gear on said driven member intermeshing with the other fixed gear on said third intermediate shaft, and clutch means on said driven member engageable to interconnect said freely rotatable gear therewith.

12. In a change speed transmission adapted to be used in a machine tool headstock having a power input shaft and a rotatable driven member such as a spindle; a reverse shaft having a gear freely rotatable thereon and operatively connected with said input shaft, clutch means on said reverse shaft engageable to interconnect said freely rotatable gear with said reverse shaft, and a gear fixed to said reverse shaft; a forward shaft having a pair of gears freely rotatable thereon and one of which gears is operatively connected with said input shaft, separate clutch means on said forward shaft engageable to interconnect said freely rotatable gears thereon with said forward shaft, a gear fixed on said forward shaft and meshing with said gear fixed on said reverse shaft, and end gears fixed to said forward shaft adjacent the opposite ends thereof; an intermediate shaft having freely rotatable thereon a pair of gears constantly meshing with the end gears fixed to said forward shaft, said freely rotatable gears on the intermediate shaft being of a different size than the corresponding intermeshing gears on the forward shaft, a gear fixed to said intermediate shaft intermediate the freely rotatable gears thereon and meshing with and of a different size than the other freely rotatable gear on said forward shaft, separate clutch means on said intermediate shaft engageable to interconnect said freely rotatable gears with said intermediate shaft, and end gears fixed on said intermediate shaft adjacent the opposite ends thereof; a second intermediate shaft provided with a pair of freely rotatable gears thereon meshing with and of a different size than said end gears on said intermediate shaft, separate clutch means on said second intermediate shaft engageable to interconnect said freely rotatable gears thereon with said second intermediate shaft, and an end gear fixed on said second intermediate shaft adjacent an end thereof; a third intermediate shaft having thereon end gears fixed thereto adjacent its opposite ends and one of which end gears meshes with and being of a different size than the end gear fixed on said second intermediate shaft, a gear freely rotatable on said third intermediate shaft, clutch means on said third intermediate shaft engageable to interconnect said freely rotatable gear with said third intermediate shaft; a gear fixed on said driven member and meshing with the freely rotatable gear on said third intermediate shaft, a gear freely rotatable on said driven member and meshing with the other end gear fixed to said third intermediate shaft, and clutch means on said driven member engageable to interconnect said freely rotatable gear with said driven member.

13. In a change speed transmission as defined in claim 12 and wherein said clutch means are friction clutches and power actuators are provided for actuating the same.

14. In a change speed transmission as defined in claim 12 and wherein said clutch means are friction clutches and hydraulic means are provided for actuating said clutch means and including a hydraulic circuit having therein a main control valve controlling the clutch means on said reverse shaft and the clutch means on said forward shaft which interconnects said one freely rotatable gear therewith, and also having therein a speed selector valve means which is indexible during a current operation of the transmission to preselect the speed of the driven member during the following operation of the transmission and is movable at the end of said current operating of the transmission to obtain the preselected speed by engaging certain other of the clutch means on said shafts.

15. In a change speed transmission adapted to be used in a machine tool headstock having a power input shaft and a rotatable driven member such as a spindle, an intermediate shaft parallel to said input shaft and spindle and having gears fixed thereto adjacent its opposite ends and a pair of gears freely rotatable thereon intermediate said fixed gears, operative connections between said freely rotatable gears and said input shaft and including means for rotating said freely rotatable gears selectively in opposite directions, separate clutch means on said intermediate shaft selectively engageable to interconnect therewith the said freely rotatable gears threon, a second intermediate shaft parallel to the previously named shafts and having thereon freely rotatable gears constantly meshing with the gears fixed on said first named intermediate shaft, separate clutch means on said second intermediate shaft selectively engageable to interconnect therewith the said freely rotatable gears thereon, and gear means operatively interconnecting said second intermediate shaft with said driven shaft and including a gear fixed on said second intermediate shaft adjacent an end thereof and outwardly of one of the freely rotatable gears thereon, a shaft parallel to said second intermediate shaft and to said driven member and having a gear freely rotatable thereon and a gear fixed thereto, a clutch on said last mentioned shaft for operatively connecting therewith said freely rotatable gear thereon, a gear fixed on said driven member and intermeshing with said last mentioned freely rotatable gear, a gear freely rotatable on said driven member and meshing with the gear fixed on said last mentioned shaft, and clutch means on said driven member for operatively connecting therewith the freely rotatable gear thereon.

16. In a change speed transmission as defined in claim 15 and wherein the clutch means on said intermediate shafts are friction clutches and power means is provided for engaging said friction clutches.

17. In a change speed transmission as defined in claim 16 and wherein said power means includes a control device indexible during a current operation of the transmission to preselect the clutch means to be engaged in the following operation of the transmission and movable endwise at the end of said current operation of the transmission to obtain the preselected clutch means engagement.

18. In a change speed transmission as defined in claim 16 and wherein said power means is hydraulic means and includes a hydraulic circuit having therein a control valve indexible to preselect during a current operation of the transmission the clutch means engagement for the following operation of the transmission and movable at the end of said current operation of the transmission to obtain the preselected clutch means engagement for the following operation of the transmission.

HARRY SCHOEPE.
HENRY W. SPREITZER.

References Cited in the file of this patent
UNITED STATES PATENTS

| Number | Name | Date |
|---|---|---|
| 832,381 | Hartness | Oct. 2, 1906 |
| 847,572 | Hanson | Mar. 19, 1907 |
| 1,342,126 | Macnab et al. | June 1, 1920 |
| 1,605,931 | Emmes | Nov. 9, 1926 |
| 1,987,006 | Foster | Jan. 8, 1935 |
| 2,050,520 | Carter | Aug. 11, 1936 |
| 2,156,596 | Lloyd | May 2, 1939 |
| 2,227,620 | Armitage et al. | Jan. 7, 1941 |
| 2,357,427 | Ruppel | Sept. 5, 1944 |
| 2,594,782 | Makant et al. | Apr. 29, 1952 |